US012739755B2

(12) United States Patent
Yuan et al.

(10) Patent No.: US 12,739,755 B2
(45) Date of Patent: Sep. 15, 2026

(54) POWER CONTROL PARAMETER IN UNIFIED TCI

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 18/288,794

(22) PCT Filed: Jul. 2, 2021

(86) PCT No.: PCT/CN2021/104169
§ 371 (c)(1),
(2) Date: Oct. 27, 2023

(87) PCT Pub. No.: WO2023/272709
PCT Pub. Date: Jan. 5, 2023

(65) Prior Publication Data

US 2024/0224192 A1 Jul. 4, 2024

(51) Int. Cl.
*H04W 52/14* (2009.01)
*H04W 52/16* (2009.01)

(52) U.S. Cl.
CPC ......... *H04W 52/146* (2013.01); *H04W 52/16* (2013.01)

(58) Field of Classification Search
CPC ... H04W 52/146; H04W 52/16; H04W 52/42; H04W 52/54
See application file for complete search history.

(56) References Cited

U.S. PATENT DOCUMENTS 10,659,207 B2 5/2020 Wang et al.
12,389,395 B2 * 8/2025 Matsumura ........... H04W 16/28
(Continued)

FOREIGN PATENT DOCUMENTS

CN 111418236 A 7/2020
CN 111901020 A 11/2020
(Continued)

OTHER PUBLICATIONS

Apple Inc: "On Beam Management Enhancement", 3GPP TSG RAN WG1 Meeting #103-e, 3GPP Draft, R1-2008438, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946661, 19 Pages, Nov. 13, 2020 (Nov. 13, 2020).

(Continued)

*Primary Examiner* — Fayyaz Alam
(74) *Attorney, Agent, or Firm* — QUALCOMM Incorporated

(57) ABSTRACT

A base station and a UE may use a unified TCI to indicate a power control parameter for a plurality of UL channels. The base station may receive the UE's capability to support the unified TCI power control parameter, and configure the at least one power control parameter associated with at least one of a first component associated with the TCI state and a plurality of second component associated with the plurality of uplink channels.

26 Claims, 10 Drawing Sheets

(56) References Cited

U.S. PATENT DOCUMENTS

| | | | | |
|---|---|---|---|---|
| 2020/0059871 | A1* | 2/2020 | Ryu | H04L 5/0048 |
| 2021/0185664 | A1* | 6/2021 | Venugopal | H04L 5/0051 |
| 2022/0232573 | A1* | 7/2022 | Farag | H04W 72/0446 |
| 2022/0345272 | A1* | 10/2022 | Guo | H04L 5/0048 |
| 2022/0376880 | A1* | 11/2022 | Zhang | H04B 7/06952 |
| 2023/0199763 | A1* | 6/2023 | Matsumura | H04W 16/28<br>370/329 |
| 2023/0224818 | A1* | 7/2023 | Haghighat | H04W 52/146<br>455/522 |
| 2024/0040583 | A1* | 2/2024 | Liu | H04W 76/20 |

FOREIGN PATENT DOCUMENTS

| | | | |
|---|---|---|---|
| CN | 112512107 | A | 3/2021 |
| WO | 2018213291 | A1 | 11/2018 |

OTHER PUBLICATIONS

International Search Report and Written Opinion—PCT/CN2021/104169—ISA/EPO—Mar. 30, 2022.

* cited by examiner

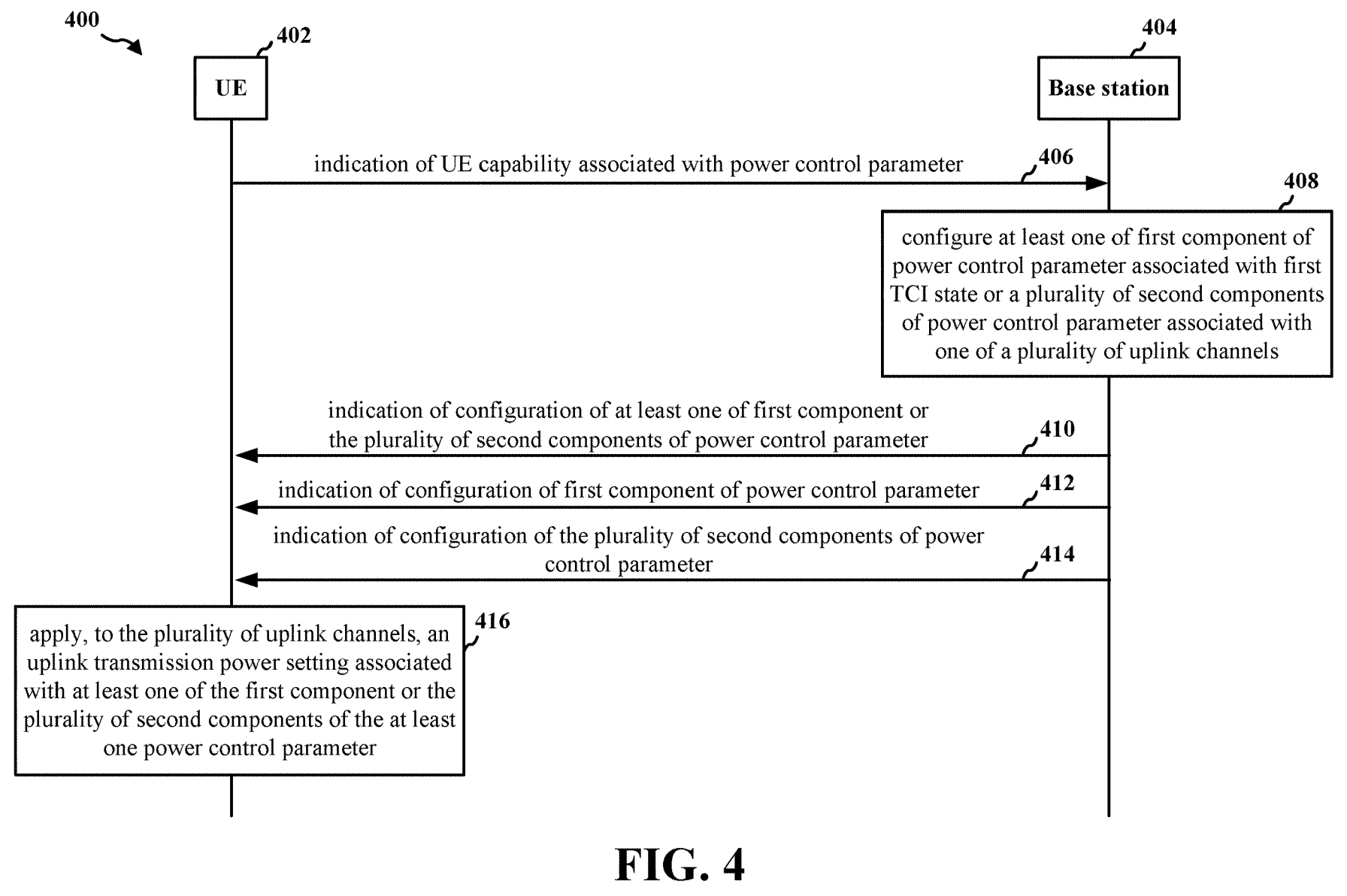

400

402 UE

404 Base station 406 indication of UE capability associated with power control parameter 408 configure at least one of first component of power control parameter associated with first TCI state or a plurality of second components of power control parameter associated with one of a plurality of uplink channels 410 indication of configuration of at least one of first component or the plurality of second components of power control parameter 412 indication of configuration of first component of power control parameter 414 indication of configuration of the plurality of second components of power control parameter 416 apply, to the plurality of uplink channels, an uplink transmission power setting associated with at least one of the first component or the plurality of second components of the at least one power control parameter

FIG. 4

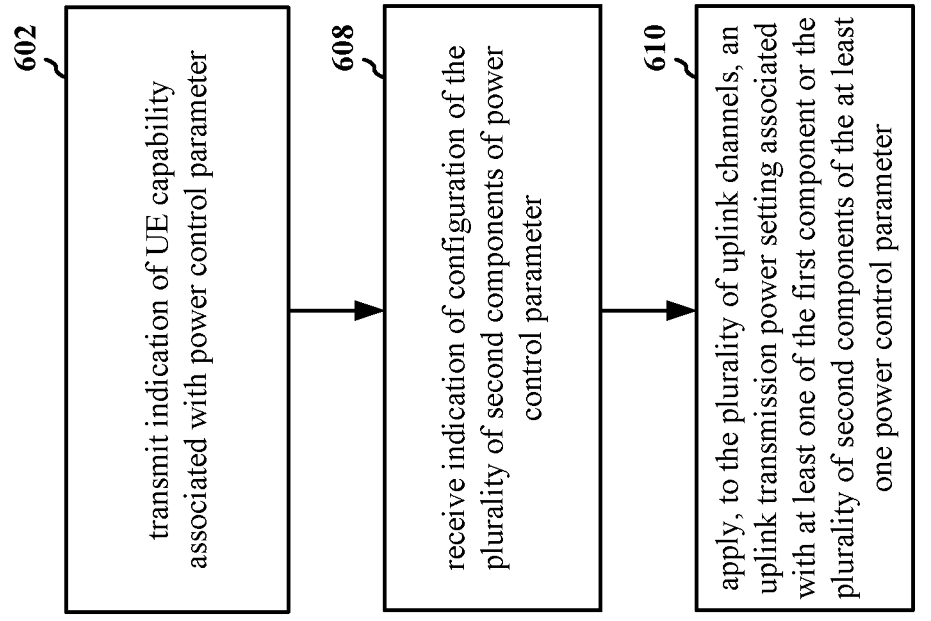
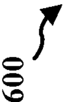
FIG. 6

800

POWER CONTROL PARAMETER IN UNIFIED TCI

CROSS REFERENCE TO RELATED APPLICATION(S)

This application is National Stage Application filed under 35 U.S.C. § 371 of PCT International Application Serial No. PCT/CN2021/104169 entitled "POWER CONTROL PARAMETER IN UNIFIED TCI" and filed on Jul. 2, 2021, which is expressly incorporated by reference herein in its entirety.

TECHNICAL FIELD

The present disclosure relates generally to communication systems, and more particularly, to a method of wireless communication utilizing power control parameters through a unified transmission configuration indicator (TCI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a UE configured to utilize power control parameters for one or more uplink channels through a unified TCI. The UE may transmit, to the base station, an indication of a UE capability associated with at least one power control parameter. The base station may receive the indication of the UE capability and configure at least one of a first component of the at least one power control parameter associated with a first TCI state or a plurality of second components of the at least one power control parameter associated with one of a plurality of uplink channels. The base station may transmit an indication of the configuration to the UE, and the UE may apply, to one of the plurality of uplink channels, an uplink transmission power setting associated with at least one of the first component of the at least one power control parameter or the plurality of second components of the at least one power control parameter. Here, the at least one power control parameter corresponds to at least one power control parameter setting, and the plurality of second components may correspond to the first TCI state or at least one other TCI state.

The indication of the configuration of the first component of the at least one power control parameter may be transmitted as a part of a TCI state update, and the indication of the configuration of the plurality of second components of the at least one power control parameter may be transmitted as a part of uplink channel configurations of the plurality of uplink channels.

In one aspect, the power control parameter of the at least one power control parameter may be associated with the plurality of uplink channels associated with the first TCI state, and a transmission power setting associated with the first power control parameter may be applied to the plurality of uplink channels.

In another aspect, the power control parameter of the at least one power control parameter may be associated with a first uplink channel of the plurality of uplink channels associated with the first TCI state, and a first transmission power setting associated with the first power control parameter may be applied to a second uplink channel of the plurality of uplink channels, where the second uplink channel is not associated with a power control parameter from the base station.

In another aspect, a first power control parameter of the at least one power control parameter may be associated with a first uplink channel of the plurality of uplink channels, and a second power control parameter of the at least one power control parameter may be associated with a second uplink channel of the plurality of uplink channels, where a first transmission power setting associated with the first power control parameter may be applied to the first uplink channel and a second transmission power setting associated with the second power control parameter may be applied to the second uplink channel. Furthermore, the first transmission power setting associated with the first power control parameter may be applied to a third uplink channel of the plurality of uplink channels, where the third uplink channel is not associated with a power control parameter from the base station.

In another aspect, at least one power control parameter is associated with the plurality of uplink channels based on a mapping order.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a communication diagram of a method of wireless communication.

FIG. 6 is a flowchart of a method of wireless communication.

DETAILED DESCRIPTION

Figure 1:
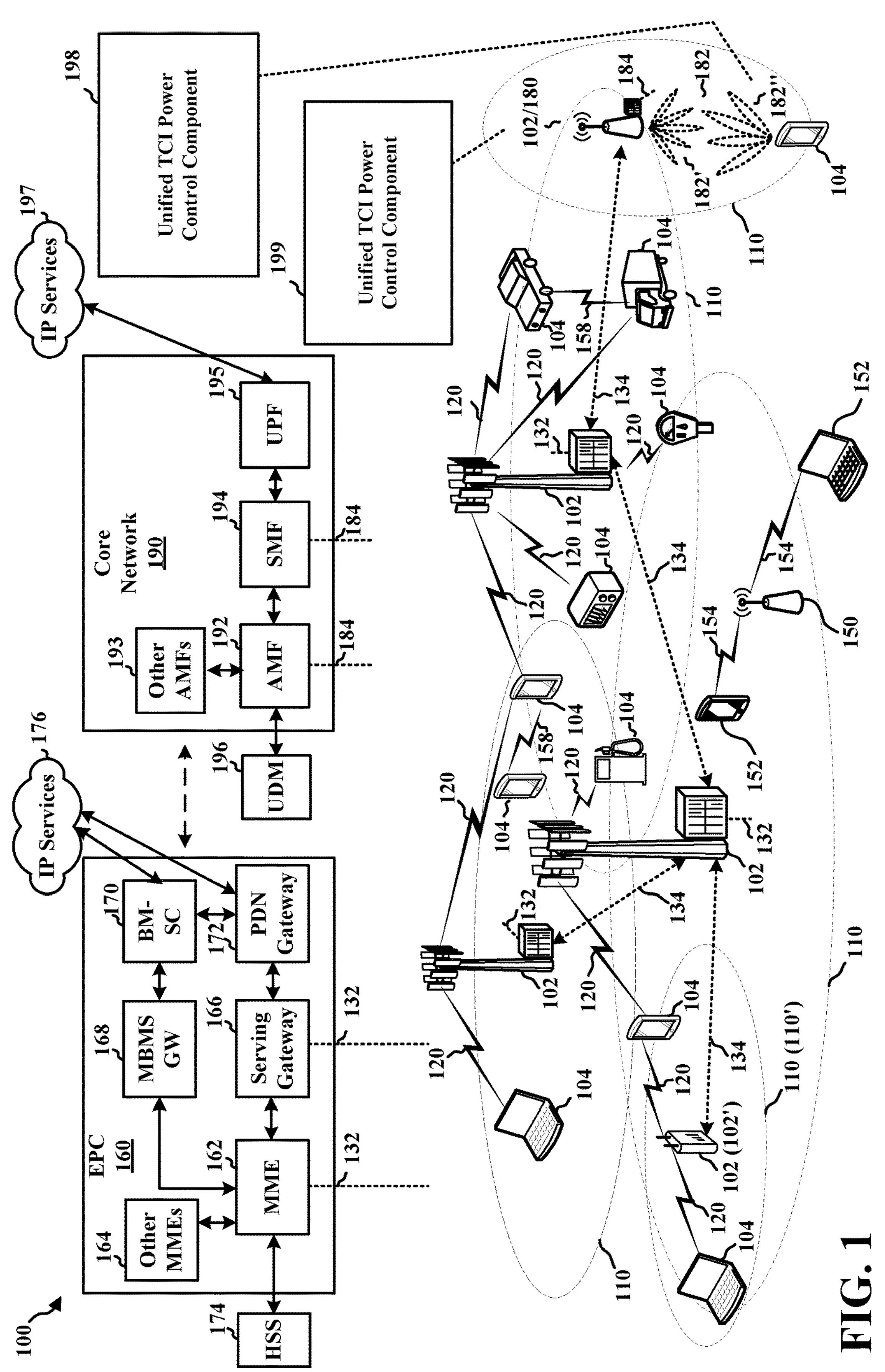
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHZ-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHZ" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a unified TCI power control component 198 configured to transmit, to a base station, an indication of a UE capability associated with at least one power control parameter, receive, from the base station, an indication of a configuration of at least one of a first component of the at least one power control parameter associated with a first TCI state or a plurality of second components of the at least one power control parameter associated with one of a plurality of uplink channels, the first component corresponding to each of the plurality of channels associated with the first TCI state, and apply, to one of the plurality of uplink channels, an uplink transmission power setting associated with at least one of the first component of the at least one power control parameter or the plurality of second components of the at least one power control parameter. In certain aspects, the base station 180 may include a unified TCI power control component 199 configured to receive, from a UE, an indication of a UE capability associated with at least one power control parameter, configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state, and transmit, to the UE, an indication of the configuration of at least one of the first component of the at least one power control parameter associated with the first TCI state or the plurality of second components of the at least one power control parameter associated with the one of the plurality of uplink channels. Although the following description may be focused on 5G NR, the concepts described herein may be applicable to other similar areas, such as LTE, LTE-A, CDMA, GSM, and other wireless technologies.

Figures 2A, 2B, 2C, 2D:
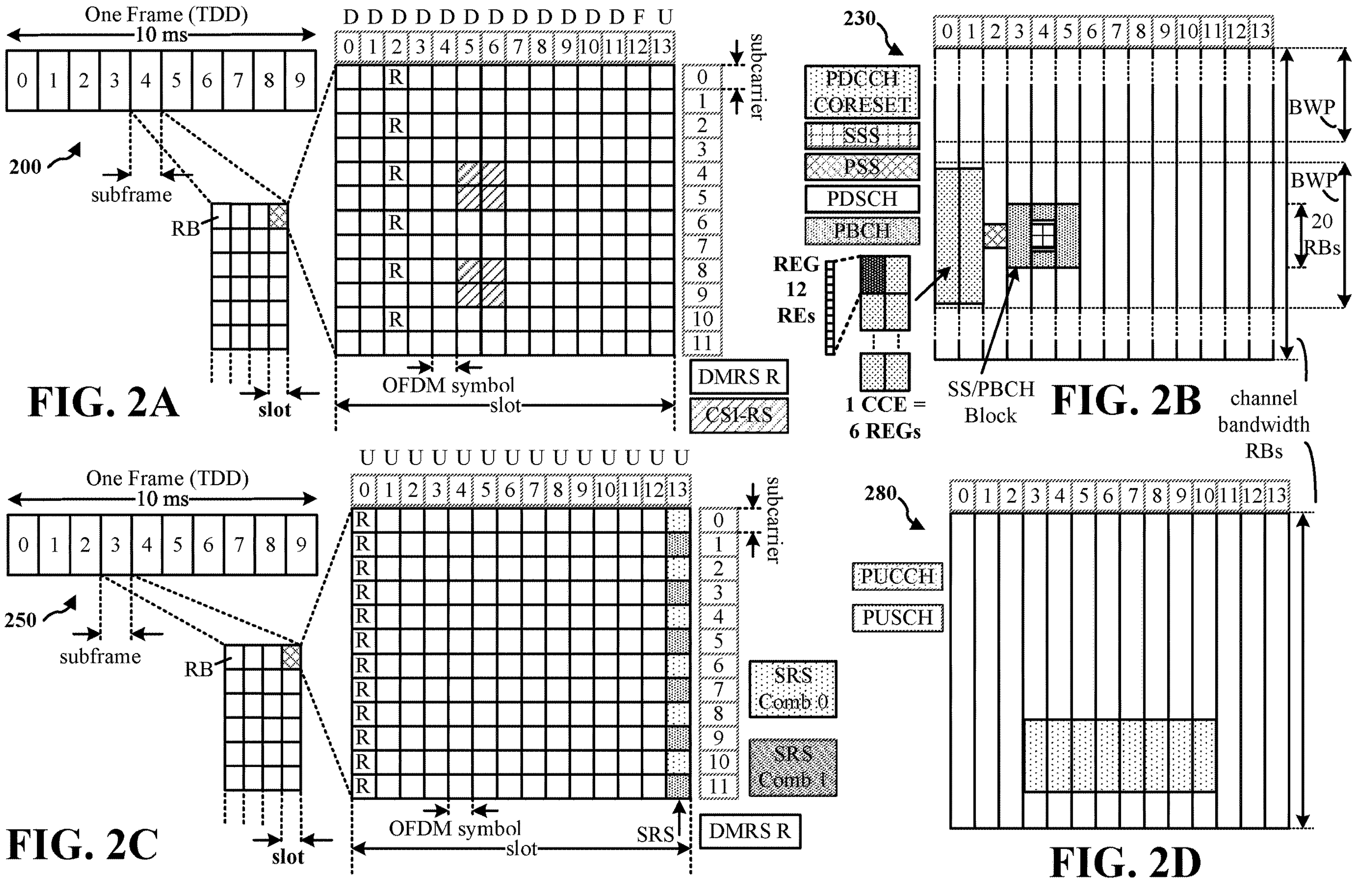
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
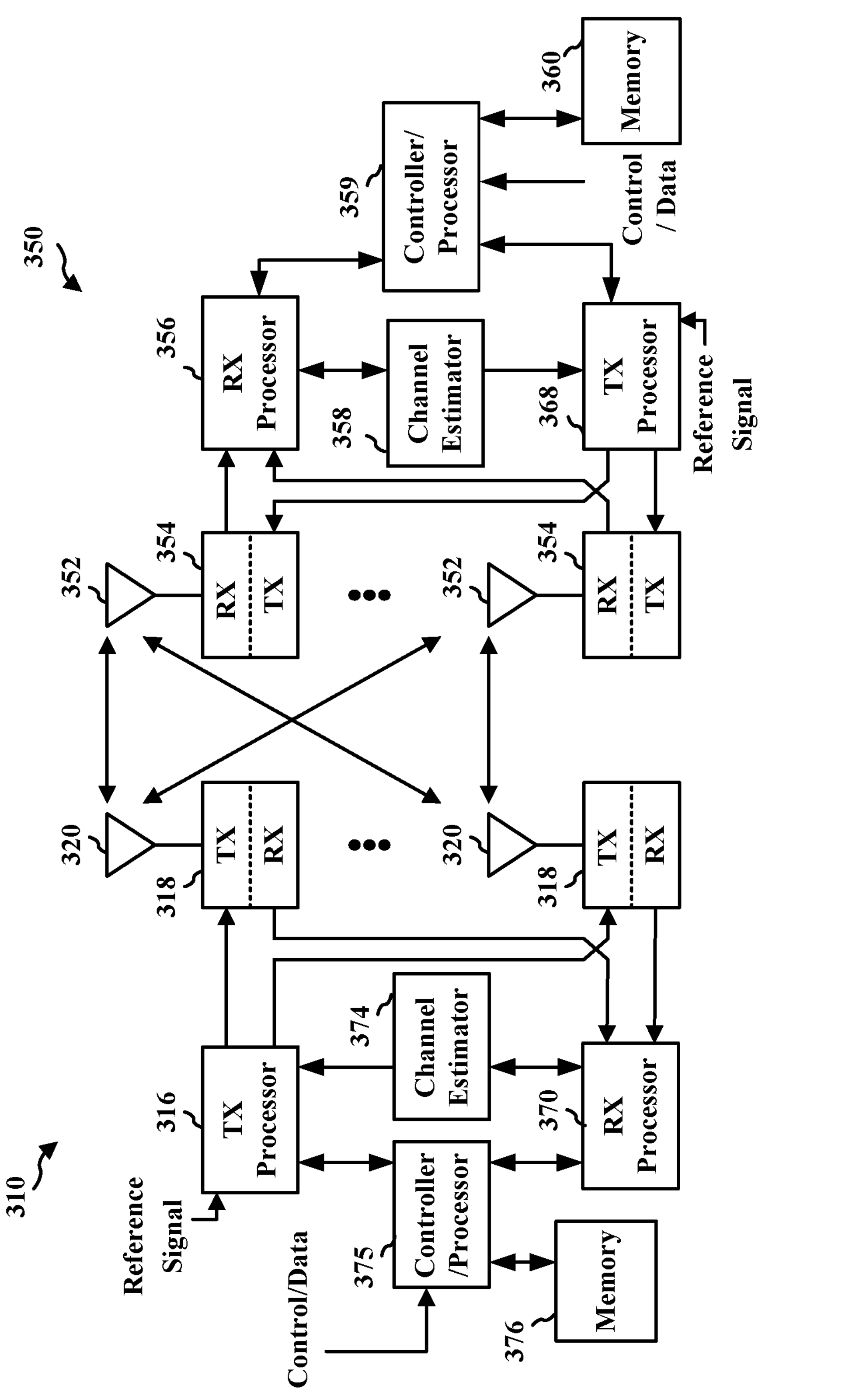
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

In some aspects of wireless communication, it may be beneficial to include an enhancement on multi-beam operation, mainly targeting higher frequency ranges such as FR2, FR3, etc., while also applicable to lower frequency ranges such as FR1. To enhance multi-beam operation, features may be identified and specified to facilitate a more efficient (e.g., lower latency and overhead) DL/UL beam management to support higher intra-cell mobility and layer 1 (L1)/layer 2 (L2)-centric inter-cell mobility and/or a larger number of configured TCI states. A common beam for data and control transmission/reception for DL and UL, especially for intra-band carrier aggregation (CA), may be specified in order to provide a unified TCI framework for DL and UL beam indications. Enhancement on signaling mechanisms for the above features to improve latency and efficiency with more usage of dynamic control signaling (as opposed to RRC) may be provided. Further, features may be identified and specified to facilitate UL beam selection for UEs equipped with multiple panels, considering UL coverage loss mitigation due to a maximum permissible exposure (MPE), based on an UL beam indication with the unified TCI framework for an UL fast panel selection.

In some aspects, a unified TCI framework for DL and UL beam indications may be provided. For example, a common beam for multiple DL and UL resources may be signaled to save beam indications and/or overhead latency. A common beam indication may be signaled via a joint DL/UL TCI state. A joint DL/UL TCI state may jointly indicate a common beam or a set of common beams applied commonly to each of multiple DL/UL resources and may include a set of information including the following steps.

In one aspect, each of the joint DL/UL TCI states may include a TCI state identification (ID). The TCI state ID may be in a dedicated ID space for a common beam(s) indication, or in a common ID space shared for a common DL/UL beam(s) indication, a DL beam indication, and/or an UL beam indication.

In another aspect, the joint DL/UL TCI state may include IDs of one or more source reference signals (RSS), providing at least one DL quasi-co-location (QCL) assumption and/or UL spatial relation information. The one or more source RSs may include a serving cell ID and a BWP ID where the one or more source RSs are located. If the serving cell ID is absent, the serving cell in which the TCI state is configured may be selected. The one or more source RSs may include various RS types, including a synchronization signal block (SSB), CSI-RS, a PRS, a PRACH, and/or dedicated demodulation reference signals (DM-RS) of a PDSCH, a PDCCH, a PUCCH, or a PUSCH.

One or more source RSs may provide various QCL assumptions and/or spatial relation information, including characteristics on delay, Doppler, and/or spatial Rx/Tx parameters. For example, the QCL may include a QCL-typeA including a Doppler shift, a Doppler spread, an average delay, and a delay spread, a QCL-typeB including the Doppler shift and the Doppler spread, a QCL-typeC including the Doppler shift and the average delay, and a QCL-typeD including a spatial Rx parameter.

The one or more source RSs may have different combinations based on provided QCL/spatial assumptions. For example, the joint DL/UL TCI state may include an ID of one source RS for QCL-TypeA/B/C. For another example, three source RSs including a first RS for QCL-Type A/B/C/, a second RS for QCL-Type D, and a third RS for spatial relation information.

In another aspect, each of the joint DL/UL TCI states may include UL timing advance (TA) parameters indicating the UE to configure the TA for the UL transmission. The one or more TA parameters may include a TA value, an identifier of a TA group (such as a TA group ID), or a combination thereof.

In another aspect, each of the joint DL/UL TCI states may include one or more parameters for codebook and/or non-codebook based PUSCH transmissions. The one or more codebook or non-codebook parameters may include an SRS resource indicator (SRI), a precoding matrix indicator (PMI) such as a transmission PMI (TPMI), a rank indicator (RI) such as a transmission rank indicator (TRI) or a combination thereof.

In another aspect, each of the joint DL/UL TCI states may include UE panel IDs or similar IDs. For example, the UE panel ID(s) associated with the common DL/UL beam may include two separate panel IDs for DL and UL or a single panel ID for both DL and UL.

In another aspect, each of the joint DL/UL TCI states may include UL power control (PC) parameters indicating the UE to configure the UL transmission power. The one or more power control parameters may include a path loss reference signal (PL-RS) (such as a CSI-RS or other reference signal), a nominal power parameter (such a P0 or other nominal power), a path loss scaling factor (such as a or other scaling factor), a close-loop index, an identifier of a power control group (such as a PC group ID), or a combination thereof.

In some aspects, each UL channel (such as a PUSCH or a PUCCH), the PC parameters or settings of P0, alpha, or closed-loop index can be associated with UL TCI state or a joint TCI state per BWP. In this case, multiple PC settings may be configured, such that each PC setting corresponds with each UL channel. That is, each PC parameter may be associated with at least one TCI state and, for a given TCI state activation, one PC parameter for the PUSCH and one PC parameter for the PUCCH may be configured at a time. In this case, for each of the PUSCH and PUCCH, each of the activated UL or joint TCI states may be associated with one of the PC parameters or settings. Accordingly, for each of the PUSCH and PUCCH, the PC settings or parameters of P0, alpha, and closed-loop index per channel/signal per BWP may be independent of the activated UL or joint TCI states. The setting of P0, alpha, and closed-loop index parameters configured for SRS may be associated with UL or joint TCI states. In one aspect, a common setting of P0, alpha, closed-loop index parameters may be configured per TCI state across channels and a channel dependent component may be applied per channel. In another aspect, a channel dependent setting of P0, alpha, and closed-loop index parameters may be configured per TCI state.

The unified TCI state may be configured and applied to multiple UL channels, and the setting of power control parameters including P0, alpha, and closed-loop index may be associated with the unified TCI state.

In some aspects, in a unified TCI framework, a base station may indicate the power control parameter of P0, alpha, and closed-loop index by configuring a UE with a common component of the power control parameter and multiple dedicated components of the power control parameter associated with UL channels applicable to the same TCI state. That is, the base station may configure a first component of at least one power control parameter associated with a TCI state and a plurality of second components of the at least one power control parameter associated with one of a plurality of uplink channels that is applicable to the TCI state.

In one aspect, one first component of the power control parameter may be associated with or indicated per TCI state, and the one first component of the power control parameter may be common to the multiple channels applicable per TCI state. In another aspect, the plurality of second components of the power control parameter may be dedicated to one of the multiple channels applicable to the TCI state. For example, a PUCCH and a PUSCH that is applicable to one TCI state may share the first component of the power control parameter associated with the shared TCI state.

The UE may combine the first component of at least one power control parameter associated with the TCI state and one second component of the plurality of second components of the at least one power control parameter associated with the corresponding UL channel. For example, a PUCCH and a PUSCH may share a first component of $P0_{common}$ for the P0 parameter. Accordingly, the P0 parameter for the PUCCH may be represented as $P0=P0_{common}+P0_{PUCCH}$ where $P0_{PUCCH}$ is dedicated for PUCCH, and the P0 parameter for the PUSCH may be represented as $P0=P0_{common}+P0_{PUSCH}$ Where $P0_{PUSCH}$ is dedicated for PUSCH. Here, the first component of the power control parameter may be associated with or include the TCI state and changed by the TCI state update, e.g., MAC-CE, and the second component of the power control parameter may be associated with or include the channel configuration, e.g., a PUCCH configuration or a PUSCH configuration. The second component of the power control parameter may be independent of the TCI state update.

In one aspect, at least one of the first or second components may be absent or not configured, and the UE may apply the non-absent component as a default configuration of the power control parameter. That is, the base station may not configure at least one of the first or second components of the power control parameter, and the UE may use the first or second components that are configured as the default configuration of the power control parameter.

In another aspect, the UE may indicate in a UE capability report that the UE may to support combining the first component of the power control parameter associated with the TCI state and the plurality of second components of the power control parameter to generate the power control parameters for UL channels that may share the same TCI State. The base station may configure the first component and the plurality of second components of the power control parameter based on the UE capability indicated by the UE.

In some aspects, a power control parameter indication (P0, alpha, closed-loop index) in the unified TCI framework may support configuring a UE with a power control parameter per TCI state, where the power control parameter common to multiple UL channels is applicable to the TCI state. That is, the base station may indicate the power control parameter by activating the corresponding TCI state, and the activated TCI state may indicate the power control parameter common to the multiple UL channels applicable to the activated TCI state. For example, the base station may activate a TCI state, and the TCI state may be associated with a $P0_{common}$ for the PUCCH and the PUSCH associated with the activated TCI state.

In one aspect, one of the UL channels may be associated with the power control parameter indication, and the UE may apply the power control parameter indicated by the TCI state to other channels applicable to the same TCI state. That is, the TCI state activated by the base station may indicate the power control parameter associated with a first UL channel, and the UE may apply the power control parameter indicated by the activated TCI state to a second UL channel applicable to the activated TCI state. For example, the base station may activate a TCI state to indicate the power control parameter associated with a PUCCH, and the UE may apply the power control parameter indicated by the activated TCI state to a PUSCH applicable to the activated TCI state.

In some aspects, power control parameter indication (P0, alpha, closed-loop index) in the unified TCI framework may support configuring a UE with each power control parameter per channel per TCI state. That is, the activated TCI state may be associated with one or more power control parameters, where the one or more power control parameters indicated by the activated TCI state are associated with specific UL channels. For example, a PUCCH and a PUSCH may be applicable to an activated TCI state, and the activated TCI state may indicate two power control parameters of $P0_{PUCCH}$ and $P0_{PUCCH}$, where $P0_{PUCCH}$ represents the P0 power control parameter for the PUCCH and $P0_{PUCCH}$ represents the P0 power control parameter for the PUSCH.

In one aspect, one of the UL channels may be associated with power control parameter indication, and the UE may apply the indication to other channels applicable to the same TCI state. That is, the TCI state activated by the base station may indicate the power control parameter associated with a first UL channel, and the UE may apply the power control parameter indicated by the activated TCI state to a second UL channel applicable to the activated TCI state. For example, the base station may activate a TCI state to indicate the power control parameter associated with a PUCCH, and the UE may apply the power control parameter indicated by the activated TCI state to a PUSCH applicable to the activated TCI state.

In some aspects, multiple settings of the power control parameter indication (P0, alpha, and closed-loop index) may be associated with or included in an activated unified TCI state, and the multiple settings of the power control parameter may be mapped to different UL channels application to the TCI state. That is, the multiple settings of the power control parameter indicated by the activated TCI state may be mapped to a plurality of UL channels based on the activation order of the multiple settings of the power control parameter. For example, the UE may apply the first activated setting of power control parameter indication to the PUSCH applicable to the unified TCI state. The UE may apply the second activated setting of power control parameter indication to the PUCCH applicable to the unified TCI state. The UE may apply the third activated setting of power control parameter indication to the SRS applicable to the unified TCI state.

The base station and the UE may use the mapping order to determine which of the multiple settings of the power control parameter may be applied to different UL channels. The base station may use a MAC-CE to activate a TCI state and also in the same MAC-CE activate multiple settings of power control parameter indication for different UL channels without explicitly indicating the UL channel type. Accordingly, we may reduce the signaling overhead to configure the power control parameters for a plurality of UL channels applicable to the same TCI state.

FIG. 4 is a communication diagram 400 of a method of wireless communication. The base station 404 may configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state. The UE 402 may apply, to one of the plurality of uplink channels, the uplink transmission power setting associated with the at least one of the first component of the at least one power control parameter or the plurality of second components of the at least one power control parameter.

At 406, the UE 402 may transmit, to the base station 404, an indication of a UE capability associated with at least one power control parameter. The base station 404 may receive, from the UE 402, the indication of the UE capability associated with the at least one power control parameter. The base station 404 may configure the at least one power control parameter based on the received UE capability associated with the at least one power control parameter.

At 408, the base station 404 may configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state. The at least one of the first component of the at least one power control parameter or the plurality of second components of the at least one power control parameter may be configured based on the indication of the UE capability received from the UE 402.

At 410, the base station 404 may transmit, to the UE 402, an indication of the configuration of at least one of the first component of the at least one power control parameter associated with the first TCI state or the plurality of second components of the at least one power control parameter associated with the one of the plurality of uplink channels. The UE 402 may receive, from the base station 404, the indication of the configuration of at least one of the first component of the at least one power control parameter associated with the first TCI state or the plurality of second components of the at least one power control parameter associated with the one of the plurality of uplink channels. In one aspect, the at least one power control parameter may correspond to at least one power control parameter setting, and the plurality of second components may correspond to the first TCI state or at least one other TCI state.

At 412, the base station 404 may transmit the indication of the configuration of the first component of the at least one power control parameter as a part of a TCI state update. The UE 402 may receive the indication of the configuration of the first component of the at least one power control parameter as a part of a TCI state update. In one aspect, the TCI state update may be received via a MAC-CE.

At 414, the base station 404 may transmit the indication of the configuration of the plurality of second components of the at least one power control parameter as a part of uplink channel configurations of the plurality of uplink channels. The UE 402 may receive the indication of the configuration of the plurality of second components of the at least one power control parameter as a part of uplink channel configurations of the plurality of uplink channels. In one aspect, the uplink channel configurations of the plurality of uplink channels may be received via an RRC message.

At 416, the UE 402 may apply, to one of the plurality of uplink channels, an uplink transmission power setting associated with at least one of the first component of the at least one power control parameter or the plurality of second components of the at least one power control parameter. In one aspect, the at least one power control parameter may be associated with the plurality of uplink channels based on a mapping order.

In one aspect, the first power control parameter of the at least one power control parameter may be associated with the plurality of uplink channels associated with the first TCI state. In another aspect, the first power control parameter of the at least one power control parameter may be associated with a first uplink channel of the plurality of uplink channels associated with the first TCI state, and the UE 402 may apply a first transmission power setting associated with the first power control parameter to a second uplink channel of the plurality of uplink channels, where the second uplink channel is not associated with a power control parameter from the base station 404.

In one aspect, the first power control parameter of the at least one power control parameter may be associated with a first uplink channel of the plurality of uplink channels, and a second power control parameter of the at least one power control parameter is associated with a second uplink channel of the plurality of uplink channels. The UE 402 may apply a first transmission power setting associated with the first power control parameter to a third uplink channel of the plurality of uplink channels, where the third uplink channel is not associated with a power control parameter from the base station 404.

Figure 5:
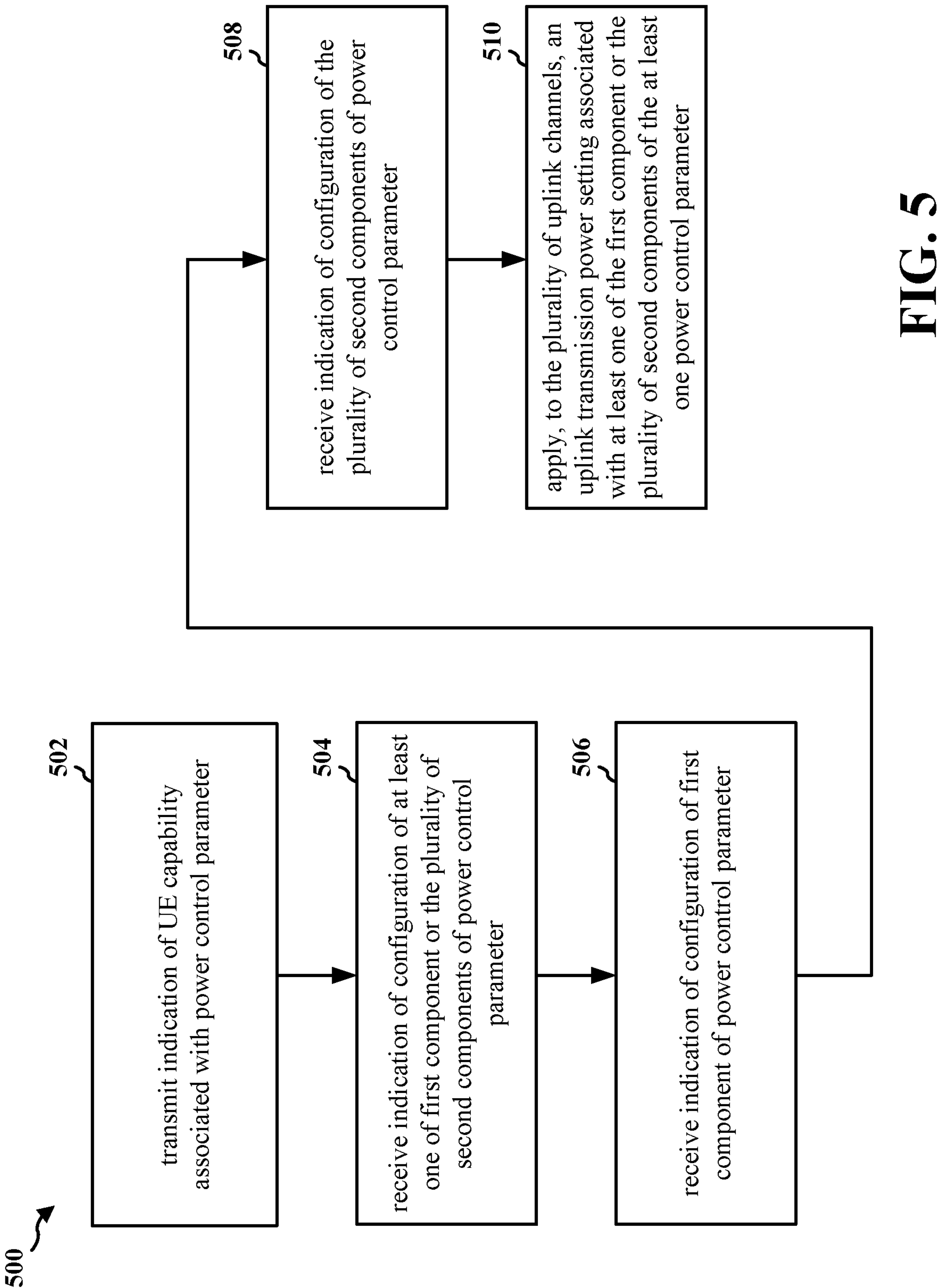
FIG. 5 is a flowchart of a method of wireless communication.

FIG. 5 is a flowchart 500 of a method of wireless communication. The method may be performed by a UE (e.g., the UE 104; the apparatus 902). The UE may apply, to one of the plurality of uplink channels, the uplink transmission power setting associated with the at least one of the first component of the at least one power control parameter or the plurality of second components of the at least one power control parameter.

At 502, the UE may transmit, to the base station, an indication of a UE capability associated with at least one power control parameter. The base station may configure the at least one power control parameter based on the received UE capability associated with the at least one power control parameter. For example, at 406, the UE 402 may be configured to transmit, to the base station 404, an indication of a UE capability associated with at least one power control parameter. Furthermore, 502 may be performed by a unified TCI power control component 940.

At 504, the UE may receive, from the base station, the indication of the configuration of at least one of the first component of the at least one power control parameter associated with the first TCI state or the plurality of second components of the at least one power control parameter associated with the one of the plurality of uplink channels. In one aspect, the at least one power control parameter may correspond to at least one power control parameter setting, and the plurality of second components may correspond to the first TCI state or at least one other TCI state. For example, at 410, the UE 402 may be configured to receive, from the base station 404, the indication of the configuration of at least one of the first component of the at least one power control parameter associated with the first TCI state or the plurality of second components of the at least one power control parameter associated with the one of the plurality of uplink channels. Furthermore, 504 may be performed by the unified TCI power control component 940.

At 506, the UE may receive the indication of the configuration of the first component of the at least one power control parameter as a part of a TCI state update. In one aspect, the TCI state update may be received via a MAC-CE. For example, at 412, the UE 402 may be configured to receive the indication of the configuration of the first component of the at least one power control parameter as a part of a TCI state update. Furthermore, 506 may be performed by the unified TCI power control component 940.

At 508, the UE may receive the indication of the configuration of the plurality of second components of the at least one power control parameter as a part of uplink channel configurations of the plurality of uplink channels. In one aspect, the uplink channel configurations of the plurality of uplink channels may be received via an RRC message. For example, at 414, the UE 402 may be configured to receive the indication of the configuration of the plurality of second components of the at least one power control parameter as a part of uplink channel configurations of the plurality of uplink channels. Furthermore, 508 may be performed by the unified TCI power control component 940.

At 510, the UE may apply, to one of the plurality of uplink channels, an uplink transmission power setting associated with at least one of the first component of the at least one power control parameter or the plurality of second components of the at least one power control parameter. In one aspect, the at least one power control parameter may be associated with the plurality of uplink channels based on a mapping order. For example, at 416, the UE 402 may be configured to apply, to one of the plurality of uplink channels, an uplink transmission power setting associated with at least one of the first component of the at least one power control parameter or the plurality of second components of the at least one power control parameter. Furthermore, 510 may be performed by an uplink channel configuration component 942.

In one aspect, the first power control parameter of the at least one power control parameter may be associated with the plurality of uplink channels associated with the first TCI state. In another aspect, the first power control parameter of the at least one power control parameter may be associated with a first uplink channel of the plurality of uplink channels associated with the first TCI state, and the UE may apply a first transmission power setting associated with the first power control parameter to a second uplink channel of the plurality of uplink channels, where the second uplink channel is not associated with a power control parameter from the base station.

In one aspect, the first power control parameter of the at least one power control parameter may be associated with a first uplink channel of the plurality of uplink channels, and a second power control parameter of the at least one power control parameter is associated with a second uplink channel of the plurality of uplink channels. The UE may apply a first transmission power setting associated with the first power control parameter to a third uplink channel of the plurality of uplink channels, where the third uplink channel is not associated with a power control parameter from the base station.

FIG. 6 is a flowchart 600 of a method of wireless communication. The method may be performed by a UE (e.g., the UE 104; the apparatus 902). The UE may apply, to one of the plurality of uplink channels, the uplink transmission power setting associated with the at least one of the first component of the at least one power control parameter or the plurality of second components of the at least one power control parameter.

At 602, the UE may transmit, to the base station, an indication of a UE capability associated with at least one power control parameter. The base station may configure the at least one power control parameter based on the received UE capability associated with the at least one power control parameter. For example, at 406, the UE 402 may be configured to transmit, to the base station 404, an indication of a UE capability associated with at least one power control parameter. Furthermore, 602 may be performed by a unified TCI power control component 940.

At 608, the UE may receive the indication of the configuration of the plurality of second components of the at least one power control parameter as a part of uplink channel configurations of the plurality of uplink channels. In one aspect, the uplink channel configurations of the plurality of uplink channels may be received via an RRC message. For example, at 414, the UE 402 may be configured to receive the indication of the configuration of the plurality of second components of the at least one power control parameter as a part of uplink channel configurations of the plurality of uplink channels. Furthermore, 608 may be performed by the unified TCI power control component 940.

At 610, the UE may apply, to one of the plurality of uplink channels, an uplink transmission power setting associated with at least one of the first component of the at least one power control parameter or the plurality of second components of the at least one power control parameter. In one aspect, the at least one power control parameter may be associated with the plurality of uplink channels based on a mapping order. For example, at 416, the UE 402 may be configured to apply, to one of the plurality of uplink channels, an uplink transmission power setting associated with at least one of the first component of the at least one power control parameter or the plurality of second components of the at least one power control parameter. Furthermore, 610 may be performed by an uplink channel configuration component 942.

In one aspect, the first power control parameter of the at least one power control parameter may be associated with the plurality of uplink channels associated with the first TCI state. In another aspect, the first power control parameter of the at least one power control parameter may be associated with a first uplink channel of the plurality of uplink channels associated with the first TCI state, and the UE may apply a first transmission power setting associated with the first power control parameter to a second uplink channel of the plurality of uplink channels, where the second uplink channel is not associated with a power control parameter from the base station.

In one aspect, the first power control parameter of the at least one power control parameter may be associated with a first uplink channel of the plurality of uplink channels, and a second power control parameter of the at least one power control parameter is associated with a second uplink channel of the plurality of uplink channels. The UE may apply a first transmission power setting associated with the first power control parameter to a third uplink channel of the plurality of uplink channels, where the third uplink channel is not associated with a power control parameter from the base station.

Figure 7:
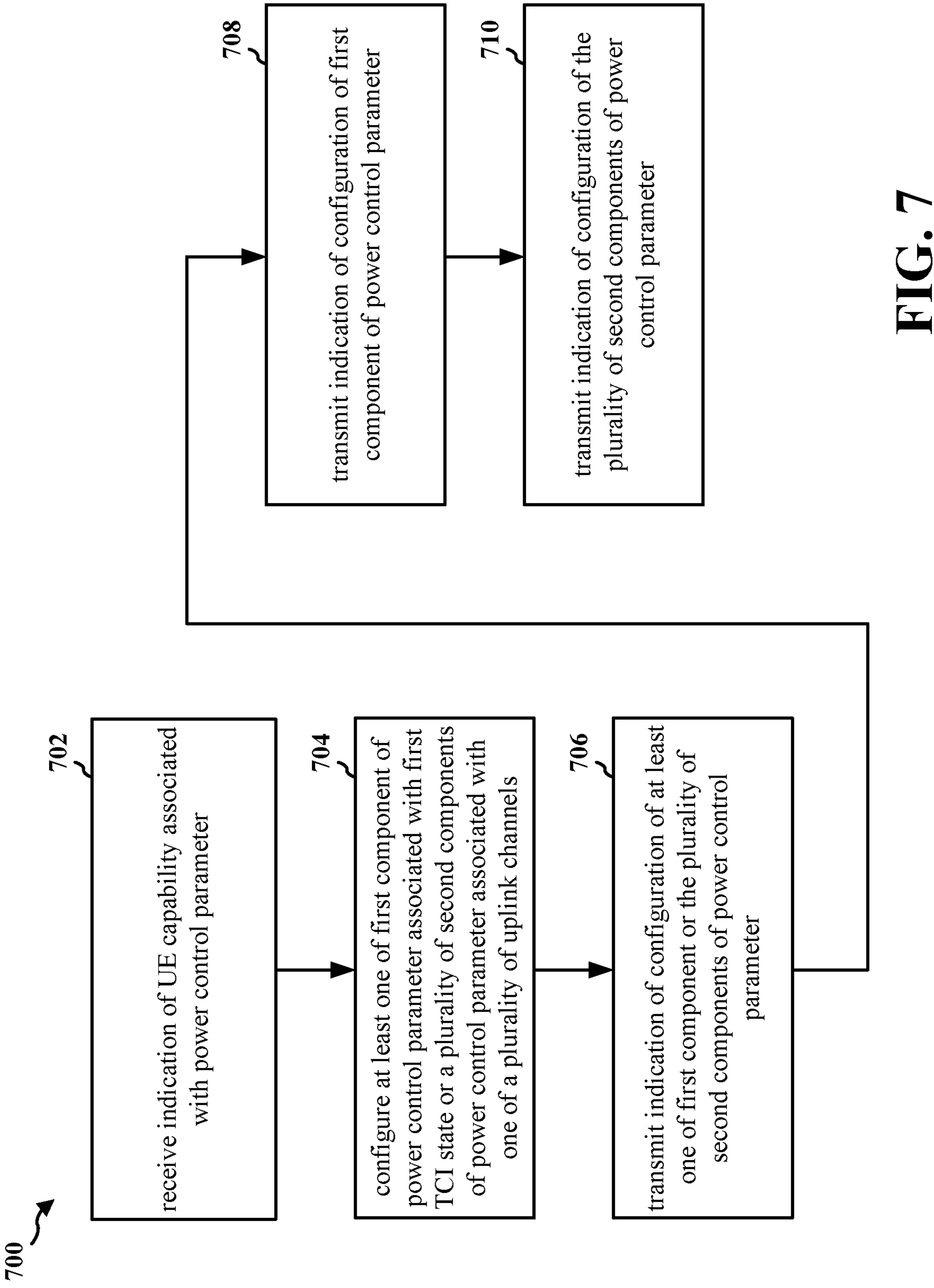
FIG. 7 is a flowchart of a method of wireless communication.

FIG. 7 is a flowchart 700 of a method of wireless communication. The method may be performed by a base station (e.g., the base station 102/180; the apparatus 1002). The base station may configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state.

At 702, the base station may receive, from the UE, the indication of the UE capability associated with the at least one power control parameter. The base station 404 may configure the at least one power control parameter based on the received UE capability associated with the at least one power control parameter. For example, at 406, the base station 404 may be configured to receive, from the UE 402, the indication of the UE capability associated with the at least one power control parameter. Furthermore, 702 may be performed by a unified TCI power control component 1040.

At 704, the base station may configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state. The at least one of the first component of the at least one power control parameter or the plurality of second components of the at least one power control parameter may be configured based on the indication of the UE capability received from the UE. For example, at 408, the base station 404 may be configured to configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state. Furthermore, 704 may be performed by the unified TCI power control component 1040.

At 706, the base station may transmit, to the UE, an indication of the configuration of at least one of the first component of the at least one power control parameter associated with the first TCI state or the plurality of second components of the at least one power control parameter associated with the one of the plurality of uplink channels. In one aspect, the at least one power control parameter may correspond to at least one power control parameter setting, and the plurality of second components may correspond to the first TCI state or at least one other TCI state. For example, at 410, the base station 404 may be configured to transmit, to the UE 402, an indication of the configuration of at least one of the first component of the at least one power control parameter associated with the first TCI state or the plurality of second components of the at least one power control parameter associated with the one of the plurality of uplink channels. Furthermore, 706 may be performed by the unified TCI power control component 1040.

At 708, the base station may transmit the indication of the configuration of the first component of the at least one power control parameter as a part of a TCI state update. In one aspect, the TCI state update may be received via a MAC-CE. For example, at 412, the base station 404 may be configured to transmit the indication of the configuration of the first component of the at least one power control parameter as a part of a TCI state update. Furthermore, 708 may be performed by the unified TCI power control component 1040.

At 710, the base station may transmit the indication of the configuration of the plurality of second components of the at least one power control parameter as a part of uplink channel configurations of the plurality of uplink channels. In one aspect, the uplink channel configurations of the plurality of uplink channels may be received via an RRC message. For example, at 414, the base station 404 may be configured to transmit the indication of the configuration of the plurality of second components of the at least one power control parameter as a part of uplink channel configurations of the plurality of uplink channels. Furthermore, 710 may be performed by the unified TCI power control component 1040.

Figure 8:
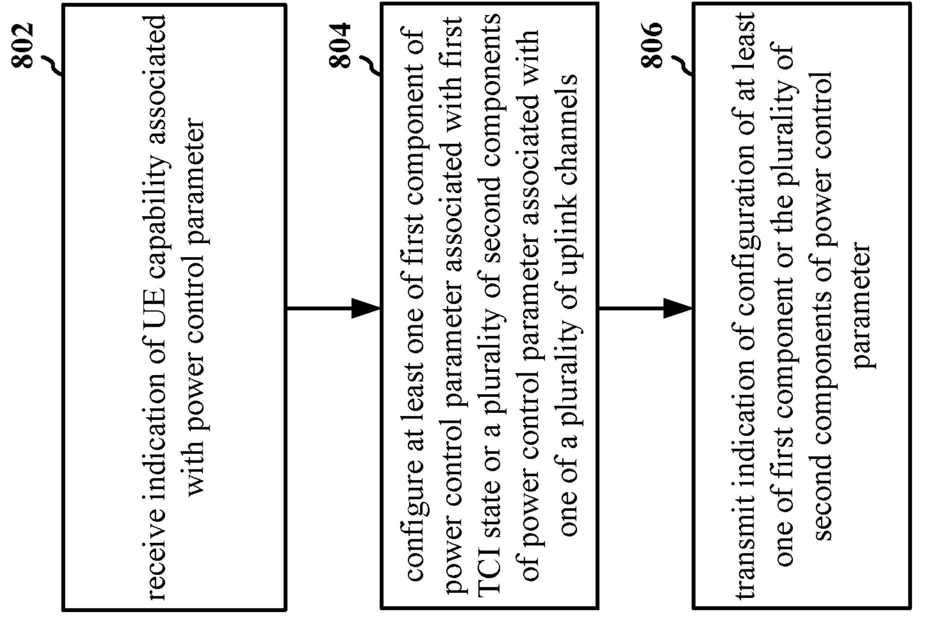
FIG. 8 is a flowchart of a method of wireless communication.

FIG. 8 is a flowchart 800 of a method of wireless communication. The method may be performed by a base station (e.g., the base station 102/180; the apparatus 1002). The base station may configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state.

At 802, the base station may receive, from the UE, the indication of the UE capability associated with the at least one power control parameter. The base station 404 may configure the at least one power control parameter based on the received UE capability associated with the at least one power control parameter. For example, at 406, the base station 404 may be configured to receive, from the UE 402, the indication of the UE capability associated with the at least one power control parameter. Furthermore, 802 may be performed by a unified TCI power control component 1040.

At 804, the base station may configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state. The at least one of the first component of the at least one power control parameter or the plurality of second components of the at least one power control parameter may be configured based on the indication of the UE capability received from the UE. For example, at 408, the base station 404 may be configured to configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state. Furthermore, 804 may be performed by the unified TCI power control component 1040.

At 806, the base station may transmit, to the UE, an indication of the configuration of at least one of the first component of the at least one power control parameter associated with the first TCI state or the plurality of second components of the at least one power control parameter associated with the one of the plurality of uplink channels. In one aspect, the at least one power control parameter may correspond to at least one power control parameter setting, and the plurality of second components may correspond to the first TCI state or at least one other TCI state. For example, at 410, the base station 404 may be configured to transmit, to the UE 402, an indication of the configuration of at least one of the first component of the at least one power control parameter associated with the first TCI state or the plurality of second components of the at least one power control parameter associated with the one of the plurality of uplink channels. Furthermore, 806 may be performed by the unified TCI power control component 1040.

Figure 9:
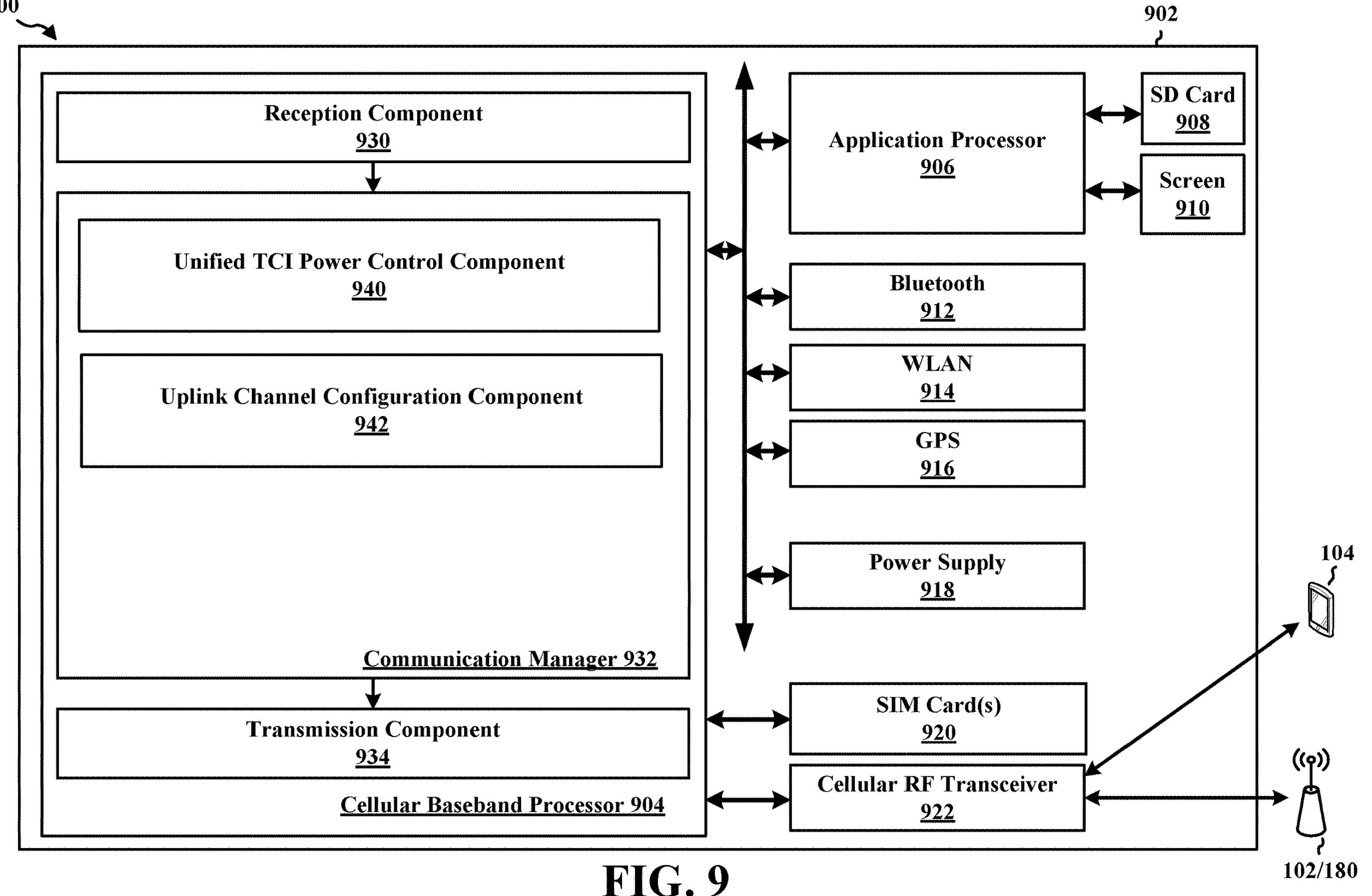
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a unified TCI power control component 940 that is configured to transmit an indication of a UE capability associated with at least one power control parameter, receive the indication of the configuration of at least one of the first component of the at least one power control parameter associated with the first TCI state or the plurality of second components of the at least one power control parameter associated with the one of the plurality of uplink channels, receive the indication of the configuration of the first component of the at least one power control parameter as a part of a TCI state update, and receive the indication of the configuration of the plurality of second components of the at least one power control parameter as a part of uplink channel configurations of the plurality of uplink channels, e.g., as described in connection with 502, 504, 506, 508, 602, and 608. The communication manager 932 further includes an uplink channel configuration component 942 that is configured to apply, to one of the plurality of uplink channels, an uplink transmission power setting associated with at least one of the first component of the at least one power control parameter or the plurality of second components of the at least one power control parameter, e.g., as described in connection with 510 and 610.

The apparatus may include additional components that perform each of the blocks of the algorithm in the flowcharts of FIGS. 4, 5, and 6. As such, each block in the flowcharts of FIGS. 4, 5, and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for transmitting, to a base station, an indication of a UE capability associated with at least one power control parameter, means for receiving, from the base station, an indication of a configuration of at least one of a first component of the at least one power control parameter associated with a first transmission configuration indicator (TCI) state or a plurality of second components of the at least one power control parameter associated with one of a plurality of uplink channels, the first component corresponding to each of the plurality of channels associated with the first TCI state, and means for applying, to one of the plurality of uplink channels, an uplink transmission power setting associated with at least one of the first component of the at least one power control parameter or the plurality of second components of the at least one power control parameter. The apparatus 902 includes means for receiving the indication of the configuration of the first component of the at least one power control parameter as a part of a TCI state update, and means for receiving the indication of the configuration of the plurality of second components of the at least one power control parameter as a part of uplink channel configurations of the plurality of uplink channels. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
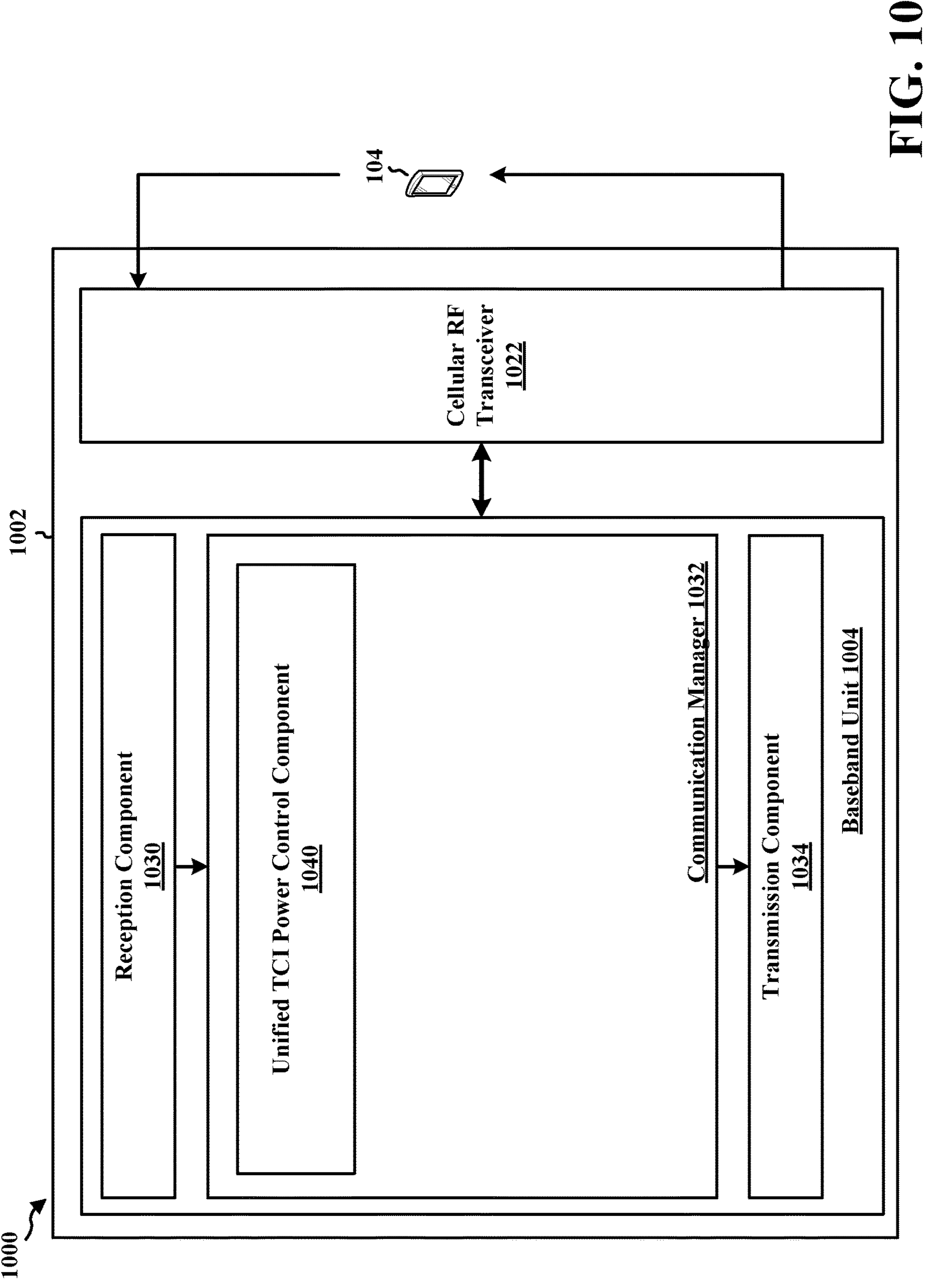
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station, a component of a base station, or may implement base station functionality. In some aspects, the apparatus 902 may include a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a unified TCI power control component 1040 that receive the indication of the UE capability associated with the at least one power control parameter, configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state, transmit an indication of the configuration of at least one of the first component of the at least one power control parameter associated with the first TCI state or the plurality of second components of the at least one power control parameter associated with the one of the plurality of uplink channels, transmit the indication of the configuration of the first component of the at least one power control parameter as a part of a TCI state update, and transmit the indication of the configuration of the plurality of second components of the at least one power control parameter as a part of uplink channel configurations of the plurality of uplink channels, e.g., as described in connection with 702, 704, 706, 708, 710, 802, 804, and 806.

The apparatus may include additional components that perform each of the blocks of the algorithm in the flowcharts of FIGS. 4, 7, and 8. As such, each block in the flowcharts of FIGS. 4, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for receiving, from a UE, an indication of a UE capability associated with at least one power control parameter, means for configuring at least one of a first component of the at least one power control parameter associated with a first TCI state or a plurality of second components of the at least one power control parameter associated with one of a plurality of uplink channels, the first component corresponding to each of the plurality of uplink channels associated with the first TCI state, and means for transmitting, to the UE, an indication of the configuration of at least one of the first component of the at least one power control parameter associated with the first TCI state or the plurality of second components of the at least one power control parameter associated with the one of the plurality of uplink channels. The apparatus 1002 includes means for transmitting the indication of the configuration of the first component of the at least one power control parameter as a part of a TCI state update and means for transmitting the indication of the configuration of the plurality of second components of the at least one power control parameter as a part of uplink channel configurations of the plurality of uplink channels. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

A base station and a UE configured to utilize power control parameters for one or more uplink channels through a unified TCI. The UE may transmit, to the base station, an indication of a UE capability associated with at least one power control parameter. The base station may receive the indication of the UE capability and configure at least one of a first component of the at least one power control parameter associated with a first TCI state or a plurality of second components of the at least one power control parameter associated with one of a plurality of uplink channels. The base station may transmit an indication of the configuration to the UE, and the UE may apply, to one of the plurality of uplink channels, an uplink transmission power setting associated with at least one of the first component of the at least one power control parameter or the plurality of second components of the at least one power control parameter. Here, the at least one power control parameter corresponds to at least one power control parameter setting, and the plurality of second components may correspond to the first TCI state or at least one other TCI state.

The indication of the configuration of the first component of the at least one power control parameter may be transmitted as a part of a TCI state update, and the indication of the configuration of the plurality of second components of the at least one power control parameter may be transmitted as a part of uplink channel configurations of the plurality of uplink channels.

In one aspect, the power control parameter of the at least one power control parameter may be associated with the plurality of uplink channels associated with the first TCI state, and a transmission power setting associated with the first power control parameter may be applied to the plurality of uplink channels.

In another aspect, the power control parameter of the at least one power control parameter may be associated with a first uplink channel of the plurality of uplink channels associated with the first TCI state, and a first transmission power setting associated with the first power control parameter may be applied to a second uplink channel of the plurality of uplink channels, where the second uplink channel is not associated with a power control parameter from the base station.

In another aspect, a first power control parameter of the at least one power control parameter may be associated with a first uplink channel of the plurality of uplink channels, and a second power control parameter of the at least one power control parameter may be associated with a second uplink channel of the plurality of uplink channels, where a first transmission power setting associated with the first power control parameter may be applied to the first uplink channel and a second transmission power setting associated with the second power control parameter may be applied to the second uplink channel. Furthermore, the first transmission power setting associated with the first power control parameter may be applied to a third uplink channel of the plurality of uplink channels, where the third uplink channel is not associated with a power control parameter from the base station.

In another aspect, at least one power control parameter is associated with the plurality of uplink channels based on a mapping order.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to transmit, to a base station, an indication of a UE capability associated with at least one power control parameter, receive, from the base station, an indication of a configuration of at least one of a first component of the at least one power control parameter associated with a first TCI state or a plurality of second components of the at least one power control parameter associated with one of a plurality of uplink channels, the first component corresponding to each of the plurality of channels associated with the first TCI state, and apply, to one of the plurality of uplink channels, an uplink transmission power setting associated with at least one of the first component of the at least one power control parameter or the plurality of second components of the at least one power control parameter.

Aspect 2 is the apparatus of aspect 1, further including a transceiver coupled to the at least one processor, where the at least one power control parameter corresponds to at least one power control parameter setting.

Aspect 3 is the apparatus of any of aspects 1 and 2, where the plurality of second components corresponds to the first TCI state or at least one other TCI state.

Aspect 4 is the apparatus of any of aspects 1 to 3, where to receive the indication of the configuration, the at least one processor and the memory are further configured to receive the indication of the configuration of the first component of the at least one power control parameter as a part of a TCI state update.

Aspect 5 is the apparatus of aspect 4, where the TCI state update is received via a MAC-CE.

Aspect 6 is the apparatus of any of aspects 1 to 5, where to receive the indication of the configuration, the at least one processor and the memory are further configured to receive the indication of the configuration of the plurality of second components of the at least one power control parameter as a part of uplink channel configurations of the plurality of uplink channels.

Aspect 7 is the apparatus of aspect 6, where the uplink channel configurations of the plurality of uplink channels are received via an RRC message.

Aspect 8 is the apparatus of any of aspects 1 to 7, where the at least one of the first component of the at least one power control parameter or the plurality of second components of the at least one power control parameter is configured based on the indication of the UE capability received from the UE.

Aspect 9 is the apparatus of any of aspects 1 to 8, where a first power control parameter of the at least one power control parameter is associated with the plurality of uplink channels associated with the first TCI state, and a first transmission power setting associated with the first power control parameter is applied to the plurality of uplink channels.

Aspect 10 is the apparatus of any of aspects 1 to 9, where a first power control parameter of the at least one power control parameter is associated with a first uplink channel of the plurality of uplink channels associated with the first TCI state, and a first transmission power setting associated with the first power control parameter is applied to a second uplink channel of the plurality of uplink channels, where the second uplink channel is not associated with a power control parameter from the base station.

Aspect 11 is the apparatus of any of aspects 1 to 10, where a first power control parameter of the at least one power control parameter is associated with a first uplink channel of the plurality of uplink channels, and a second power control parameter of the at least one power control parameter is associated with a second uplink channel of the plurality of uplink channels, where a first transmission power setting associated with the first power control parameter is applied to the first uplink channel and a second transmission power setting associated with the second power control parameter is applied to the second uplink channel.

Aspect 12 is the apparatus of aspect 11, where the first transmission power setting associated with the first power control parameter is applied to a third uplink channel of the plurality of uplink channels, where the third uplink channel is not associated with a power control parameter from the base station.

Aspect 13 is the apparatus of any of aspects 1 to 12, where the at least one power control parameter is associated with the plurality of uplink channels based on a mapping order.

Aspect 14 is a method of wireless communication for implementing any of aspects 1 to 13.

Aspect 15 is an apparatus for wireless communication including means for implementing any of aspects 1 to 13.

Aspect 16 is a computer-readable medium storing computer executable code, where the code when executed by a processor causes the processor to implement any of aspects 1 to 13.

Aspect 17 is an apparatus for wireless communication at a base station including at least one processor coupled to a memory and configured to receive, from a UE, an indication of a UE capability associated with at least one power control parameter, configure at least one of a first component of the at least one power control parameter associated with a first TCI state or a plurality of second components of the at least one power control parameter associated with one of a plurality of uplink channels, the first component corresponding to each of the plurality of uplink channels associated with the first TCI state, and transmit, to the UE, an indication of the configuration of at least one of the first component of the at least one power control parameter associated with the first TCI state or the plurality of second components of the at least one power control parameter associated with the one of the plurality of uplink channels.

Aspect 18 is the apparatus of aspect 17, further including a transceiver coupled to the at least one processor, where the at least one power control parameter corresponds to at least one power control parameter setting.

Aspect 19 is the apparatus of any of aspects 17 and 18, where the plurality of second components corresponds to the first TCI state or at least one other TCI state.

Aspect 20 is the apparatus of any of aspects 17 to 19, where to transmit the indication of the configuration, the at least one processor and the memory are further configured to transmit the indication of the configuration of the first component of the at least one power control parameter as a part of a TCI state update.

Aspect 21 is the apparatus of aspect 20, where the TCI state update is transmitted via a MAC-CE.

Aspect 22 is the apparatus of any of aspects 17 to 21, where to transmit the indication of the configuration, the at least one processor and the memory are further configured to transmit the indication of the configuration of the plurality of second components of the at least one power control parameter as a part of uplink channel configurations of the plurality of uplink channels.

Aspect 23 is the apparatus of aspect 22, where the uplink channel configurations of the plurality of uplink channels are transmitted via an RRC message.

Aspect 24 is the apparatus of any of aspects 17 to 23, where the at least one of the first component of the at least one power control parameter or the plurality of second components of the at least one power control parameter is configured based on the indication of the UE capability received from the UE.

Aspect 25 is the apparatus of any of aspects 17 to 24, where a first power control parameter of the at least one power control parameter is associated with the plurality of uplink channels associated with the first TCI state.

Aspect 26 is the apparatus of any of aspects 17 to 25, where a first power control parameter of the at least one power control parameter is associated with a first uplink channel of the plurality of uplink channels associated with the first TCI state, and a first transmission power setting associated with the first power control parameter is applicable to a second uplink channel of the plurality of uplink channels, where the second uplink channel is not associated with a power control parameter from the base station.

Aspect 27 is the apparatus of any of aspects 17 to 26, where a first power control parameter of the at least one power control parameter is associated with a first uplink channel of the plurality of uplink channels, and a second power control parameter of the at least one power control parameter is associated with a second uplink channel of the plurality of uplink channels.

Aspect 28 is the apparatus of aspect 27, where a first transmission power setting associated with the first power control parameter is applicable to a third uplink channel of the plurality of uplink channels, where the third uplink channel is not associated with a power control parameter from the base station.

Aspect 29 is the apparatus of any of aspects 17 to 28, where the at least one power control parameter is associated with the plurality of uplink channels based on a mapping order.

Aspect 30 is a method of wireless communication for implementing any of aspects 17 to 29.

Aspect 31 is an apparatus for wireless communication including means for implementing any of aspects 17 to 29.

Aspect 32 is a computer-readable medium storing computer executable code, where the code when executed by a processor causes the processor to implement any of aspects 17 to 29.

What is claimed is:

1. An apparatus for wireless communication at a user equipment (UE), comprising:

a memory; and at least one processor coupled to the memory, the at least one processor and the memory being configured to:

transmit, to a base station, an indication of a UE capability associated with at least one power control parameter;

receive, from the base station, an indication of a configuration of at least one of a first component of the at least one power control parameter associated with a first transmission configuration indicator (TCI) state or a plurality of second components of the at least one power control parameter associated with one of a plurality of uplink channels, the first component corresponding to each of the plurality of channels associated with the first TCI state; and apply, to one of the plurality of uplink channels, an uplink transmission power setting associated with at least one of the first component of the at least one power control parameter or the plurality of second components of the at least one power control parameter;

wherein the at least one power control parameter corresponds to at least one power control parameter setting.

2. The apparatus of claim 1, wherein the plurality of second components corresponds to the first TCI state or at least one other TCI state.

3. The apparatus of claim 1, wherein to receive the indication of the configuration, the at least one processor and the memory are further configured to:

receive the indication of the configuration of the first component of the at least one power control parameter as a part of a TCI state update.

4. The apparatus of claim 3, wherein the TCI state update is received via a medium access control (MAC) control element (CE) (MAC-CE).

5. The apparatus of claim 1, wherein to receive the indication of the configuration, the at least one processor and the memory are further configured to:

receive the indication of the configuration of the plurality of second components of the at least one power control parameter as a part of uplink channel configurations of the plurality of uplink channels.

6. The apparatus of claim 5, wherein the uplink channel configurations of the plurality of uplink channels are received via a radio resource control (RRC) message.

7. The apparatus of claim 1, wherein the at least one of the first component of the at least one power control parameter or the plurality of second components of the at least one power control parameter is configured based on the indication of the UE capability received from the UE.

8. The apparatus of claim 1, wherein a first power control parameter of the at least one power control parameter is associated with the plurality of uplink channels associated with the first TCI state, and a first transmission power setting associated with the first power control parameter is applied to the plurality of uplink channels.

9. The apparatus of claim 1, wherein a first power control parameter of the at least one power control parameter is associated with a first uplink channel of the plurality of uplink channels associated with the first TCI state, and a first transmission power setting associated with the first power control parameter is applied to a second uplink channel of the plurality of uplink channels, wherein the second uplink channel is not associated with a power control parameter from the base station.

10. The apparatus of claim 1, wherein a first power control parameter of the at least one power control parameter is associated with a first uplink channel of the plurality of uplink channels, and a second power control parameter of the at least one power control parameter is associated with a second uplink channel of the plurality of uplink channels, wherein a first transmission power setting associated with the first power control parameter is applied to the first uplink channel and a second transmission power setting associated with the second power control parameter is applied to the second uplink channel.

11. The apparatus of claim 10, wherein the first transmission power setting associated with the first power control parameter is applied to a third uplink channel of the plurality of uplink channels, wherein the third uplink channel is not associated with a power control parameter from the base station.

12. The apparatus of claim 1, wherein the at least one power control parameter is associated with the plurality of uplink channels based on a mapping order.

13. A method of wireless communication at a user equipment (UE), comprising:

transmitting, to a base station, an indication of a UE capability associated with at least one power control parameter;

receiving, from the base station, an indication of a configuration of at least one of a first component of the at least one power control parameter associated with a first transmission configuration indicator (TCI) state or a plurality of second components of the at least one power control parameter associated with one of a plurality of uplink channels, the first component corresponding to each of the plurality of channels associated with the first TCI state; and applying, to one of the plurality of uplink channels, an uplink transmission power setting associated with at least one of the first component of the at least one power control parameter or the plurality of second components of the at least one power control parameter;

wherein the receiving the indication of the configuration comprises:

receiving the indication of the configuration of the first component of the at least one power control parameter as a part of a TCI state update; or receiving the indication of the configuration of the plurality of second components of the at least one power control parameter as a part of uplink channel configurations of the plurality of uplink channels.

14. An apparatus for wireless communication at a base station, comprising:

a memory; and at least one processor coupled to the memory, the at least one processor and the memory being configured to:

receive, from a user equipment (UE), an indication of a UE capability associated with at least one power control parameter;

configure at least one of a first component of the at least one power control parameter associated with a first transmission configuration indicator (TCI) state or a plurality of second components of the at least one power control parameter associated with one of a plurality of uplink channels, the first component corresponding to each of the plurality of uplink channels associated with the first TCI state; and transmit, to the UE, an indication of the configuration of at least one of the first component of the at least one power control parameter associated with the first TCI state or the plurality of second components of the at least one power control parameter associated with the one of the plurality of uplink channels;

wherein the plurality of second components corresponds to the first TCI state or at least one other TCI state.

15. The apparatus of claim 14, further comprising a transceiver coupled to the at least one processor, wherein the at least one power control parameter corresponds to at least one power control parameter setting.

16. The apparatus of claim 14, wherein to transmit the indication of the configuration, the at least one processor and the memory are further configured to:

transmit the indication of the configuration of the first component of the at least one power control parameter as a part of a TCI state update.

17. The apparatus of claim 16, wherein the TCI state update is transmitted via a medium access control (MAC) control element (CE) (MAC-CE).

18. The apparatus of claim 14, wherein to transmit the indication of the configuration, the at least one processor and the memory are further configured to:

transmit the indication of the configuration of the plurality of second components of the at least one power control parameter as a part of uplink channel configurations of the plurality of uplink channels.

19. The apparatus of claim 18, wherein the uplink channel configurations of the plurality of uplink channels are transmitted via a radio resource control (RRC) message.

20. The apparatus of claim 14, wherein the at least one of the first component of the at least one power control parameter or the plurality of second components of the at least one power control parameter is configured based on the indication of the UE capability received from the UE.

21. The apparatus of claim 14, wherein a first power control parameter of the at least one power control parameter is associated with the plurality of uplink channels associated with the first TCI state.

22. The apparatus of claim 14, wherein a first power control parameter of the at least one power control parameter is associated with a first uplink channel of the plurality of uplink channels associated with the first TCI state, and a first transmission power setting associated with the first power control parameter is applicable to a second uplink channel of the plurality of uplink channels, wherein the second uplink channel is not associated with a power control parameter from the base station.

23. The apparatus of claim 14, wherein a first power control parameter of the at least one power control parameter is associated with a first uplink channel of the plurality of uplink channels, and a second power control parameter of the at least one power control parameter is associated with a second uplink channel of the plurality of uplink channels.

24. The apparatus of claim 23, wherein a first transmission power setting associated with the first power control parameter is applicable to a third uplink channel of the plurality of uplink channels, wherein the third uplink channel is not associated with a power control parameter from the base station.

25. The apparatus of claim 14, wherein the at least one power control parameter is associated with the plurality of uplink channels based on a mapping order.

26. A method of wireless communication at a base station, comprising:

receiving, from a user equipment (UE), an indication of a UE capability associated with at least one power control parameter;

configuring at least one of a first component of the at least one power control parameter associated with a first transmission configuration indicator (TCI) state or a plurality of second components of the at least one power control parameter associated with one of a plurality of uplink channels, the first component corresponding to each of the plurality of uplink channels associated with the first TCI state; and transmitting, to the UE, an indication of the configuration of at least one of the first component of the at least one power control parameter associated with the first TCI state or the plurality of second components of the at least one power control parameter associated with the one of the plurality of uplink channels;

wherein the transmitting the indication of the configuration comprises:

transmitting the indication of the configuration of the first component of the at least one power control parameter as a part of a TCI state update; or transmitting the indication of the configuration of the plurality of second components of the at least one power control parameter as a part of uplink channel configurations of the plurality of uplink channels.

* * * * *